United States Patent
Rawal et al.

(10) Patent No.: US 9,026,562 B2
(45) Date of Patent: May 5, 2015

(54) METHODS AND SYSTEMS FOR AGNOSTIC DATA STORAGE

(71) Applicants: Sandeep Rawal, Wyckoff, NJ (US); David Edward Browne, Glen Oaks, NY (US); Stephen Scott DaSilva, New York, NY (US)

(72) Inventors: Sandeep Rawal, Wyckoff, NJ (US); David Edward Browne, Glen Oaks, NY (US); Stephen Scott DaSilva, New York, NY (US)

(73) Assignee: HazelTree Fund Services, Inc., New York, NY (US)

( * ) Notice: Subject to any disclaimer, the term of this patent is extended or adjusted under 35 U.S.C. 154(b) by 0 days.

(21) Appl. No.: 13/646,321

(22) Filed: Oct. 5, 2012

(65) Prior Publication Data

US 2014/0101206 A1  Apr. 10, 2014

(51) Int. Cl.
*G06F 17/30* (2006.01)

(52) U.S. Cl.
CPC .............................. *G06F 17/30339* (2013.01)

(58) Field of Classification Search
CPC .............. G06F 17/30; G06F 17/30339; G06F 17/30286; G06F 17/30289; G06F 17/30312; G06F 17/30091

USPC .......................................... 707/809, 812, 803
See application file for complete search history.

(56) References Cited

U.S. PATENT DOCUMENTS

| | | | | |
|---|---|---|---|---|
| 5,799,184 A * | 8/1998 | Fulton et al. | ........................... | 1/1 |
| 5,799,308 A * | 8/1998 | Dixon | ........................... | 707/812 |
| 6,728,727 B2 * | 4/2004 | Komine et al. | ........................... | 1/1 |
| 7,676,482 B2 * | 3/2010 | Sprague et al. | ......... | 707/999.101 |
| 8,156,159 B2 * | 4/2012 | Ebrahimi et al. | ............. | 707/804 |
| 8,176,118 B2 * | 5/2012 | Nagasaka et al. | ............. | 709/203 |
| 2003/0208509 A1 * | 11/2003 | Komine et al. | ............... | 707/200 |
| 2009/0119331 A1 * | 5/2009 | Zeggert | ........................ | 707/102 |
| 2010/0205189 A1 * | 8/2010 | Ebrahimi et al. | ............. | 707/757 |
| 2011/0040747 A1 * | 2/2011 | Brad et al. | .................... | 707/722 |

\* cited by examiner

*Primary Examiner* — Debbie Le

(74) *Attorney, Agent, or Firm* — Sheppard Mullin Richter & Hampton LLP

(57) ABSTRACT

Methods and systems of agnostic data storage are provided. The agnostic data storage systems and methods store data records of various data types from different data sources. The method stores IDs and data elements of data records in different data tables. IDs of data records are stored in a first table, and data elements of data records are stored in a second table. Data entries of the second table are linked to an entry in the first table. The second table stores data element name, data element value, and data element data type respectively.

23 Claims, 6 Drawing Sheets

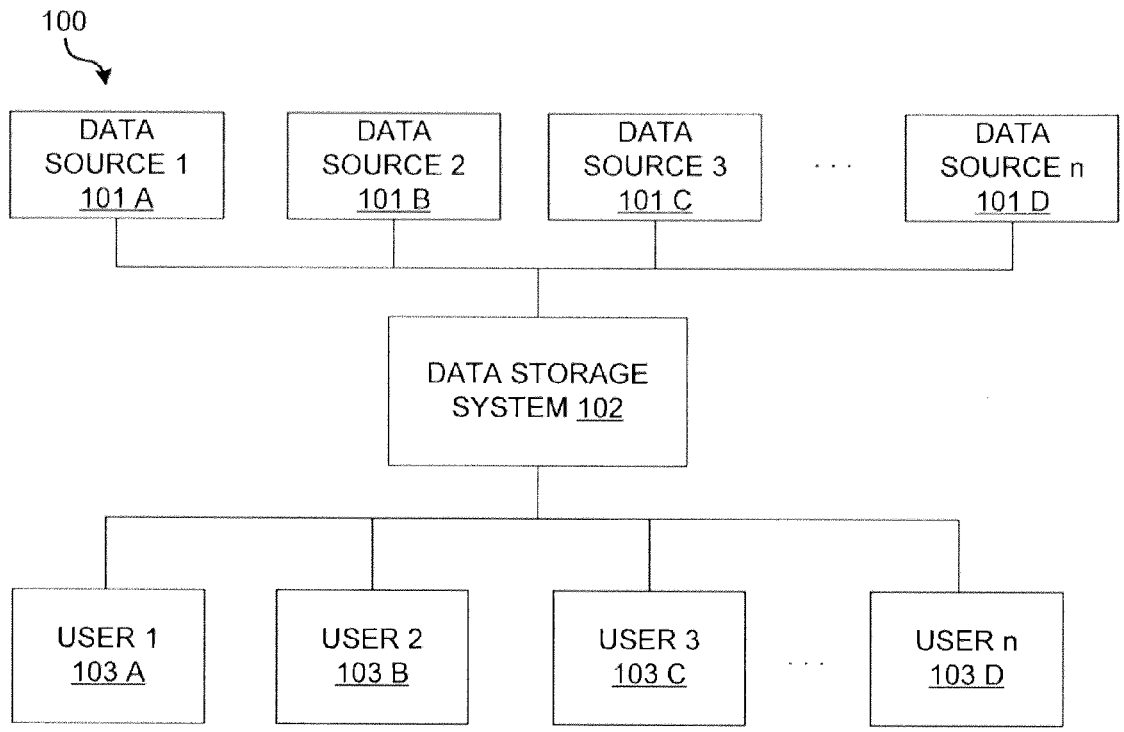
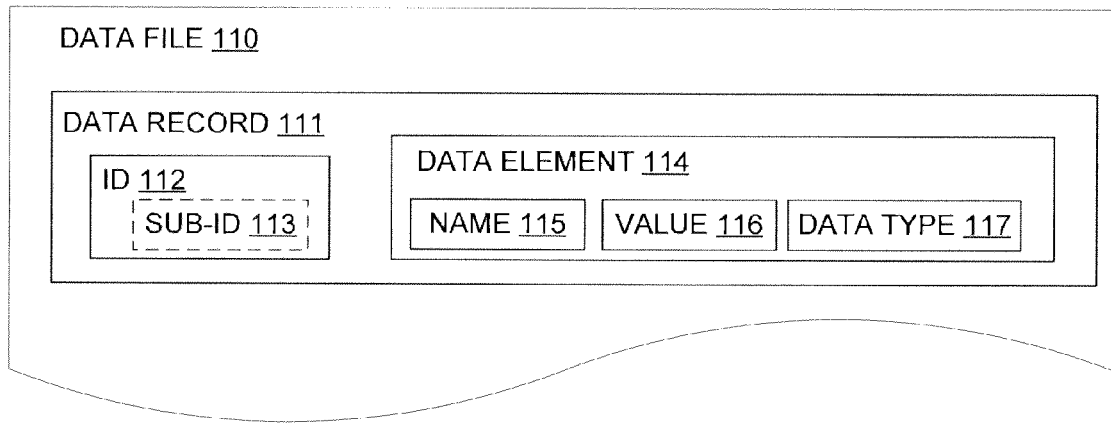
FIG. 1

300

| INSTANCE 301 |||
| --- | --- | --- |
| COLUMN NAME 302 | TYPE 303 | NULLABLE 304 |
| INSTANCEID 305 | INT | NO |
| NATURALKEY 306 | VARBINARY | NO |
| ID 307 | (INT, VARCHAR, ETC) | NO |
| SUB ID 308 | (INT, VARCHAR, ETC) | NO |
| ADDITIONAL KEYS 309 | (INT, VARCHAR, DATETIME, TIMESTAMP, ETC) | NO |

| INSTANCEDATA 311 |||
| --- | --- | --- |
| COLUMN NAME 312 | TYPE 313 | NULLABLE 314 |
| INSTANCEDATAID 315 | INT | NO |
| INSTANCEID 316 | INT | NO |
| NAME 317 | VARCHAR | NO |
| VALUETEXT 318 | VARCHAR | YES |
| VALUEDECIMAL 319 | DECIMAL | YES |
| VALUEDATETIME 320 | DATETIME | YES |
| VALUEBIT 321 | BIT | YES |
| ADDITIONAL KEYS 322 | (INT, VARCHAR, DATETIME, TIMESTAMP, ETC) | NO |

FIG. 3

INSTANCE 301

| INSTANCEID 305 | ID 307 | GEN 401 |
|---|---|---|
| 511 | 3 | 1 |
| 312 | 6 | 0 |
| ... | ... | ... |

INSTANCEDATA 311

| INSTANCE DATAID 315 | INSTANCE ID 316 | NAME 317 | VALUE TEXT 318 | VALUE DECIMAL 319 | VALUE DATETIME 320 | VALUE BIT 321 | GEN 402 | |
|---|---|---|---|---|---|---|---|---|
| 3027 | 511 | DATE | NULL | NULL | 2012-07-05 12:01:00 | NULL | 0 | ... |
| 3028 | 511 | QUANTITY | NULL | 66.20000000 | NULL | NULL | 1 | |
| 3029 | 511 | SHIPPED | NULL | NULL | NULL | 0 | 0 | |
| 3030 | 511 | NAME | DOE | NULL | NULL | NULL | 0 | |
| ... | ... | ... | ... | ... | ... | ... | ... | |

FIG. 4

METHODS AND SYSTEMS FOR AGNOSTIC DATA STORAGE

TECHNICAL FIELD

The present invention relates generally to computer systems, and more particularly, some embodiments relate to data storage systems.

DESCRIPTION OF THE RELATED ART

Data storage systems are commonly used for storing data and many other applications, such as monitoring and analyzing business activities. Businesses are exposed to receive and utilize large amounts of data every day. This data needs to be transformed and stored in a data storage system for business purposes, e.g., future analysis or reference. Traditional data storage systems are designed with data structures that are, in general, dependent from the business process and source data. These data structures are typically designed specifically for each data source. Usually, one or more data structures are needed for a data source. These data structures are more defined and expensive to reorganize, and need to be updated when the data source changes. This process can be very time-consuming, prone to errors, and resource intensive. Also, when the data source changes, it can be very difficult to track the changes to a record among large amounts of data stored. Further, when the data source adds a new data type, it can be time consuming, difficult and expensive to change the data storage system to store data having the new data type. Moreover, it is difficult to view the data stored using the previous data structure.

Brief Summary of Embodiments of the Invention

According to various embodiments of the systems and methods described herein, agnostic data storage systems and methods are provided. The agnostic data storage system and method have data structures that are more extensive over time and are capable of saving different source data having different data types or structures from different data sources. Various embodiments are closely integrated with various data sources with various data types. In one embodiment, the data storage system can be easily updated even when new data types are introduced into the storage system. That is, in some embodiments, new data types can be added and accommodated as needed. In one embodiment, when there are new changes in the data source, the data storage system can be configured to track changes in different generations of data stored. Various embodiments can be implemented to accommodate, switch to or reconstruct older views of the data stored.

According to an embodiment of the invention, a method of storing a set of data records comprises receiving the set of data records from a data source for storage in a data store. The data record of the set of data records comprises an identification (ID) and a data element, and the data store comprises a first data table and a second data table. The method stores the ID as a first data table entry in the first data table, and stores the data element as a second data table entry in the second data table. The second data table entry comprises a link to the first data table entry, a data element name of the data element, a data element value of the data element, and a data element data type of the data element.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention.

FIG. 1 is a diagram illustrating a simplified environment in which an exemplary agnostic data storage system operates in accordance with an embodiment of the systems and methods described herein.

FIG. 3 is a diagram illustrating data structures for an exemplary agnostic data storage system in accordance with an embodiment of the systems and methods described herein.

FIG. 4 is a diagram illustrating data tables of an exemplary agnostic data storage system in accordance with an embodiment of the systems and methods described herein.

Figure 2:
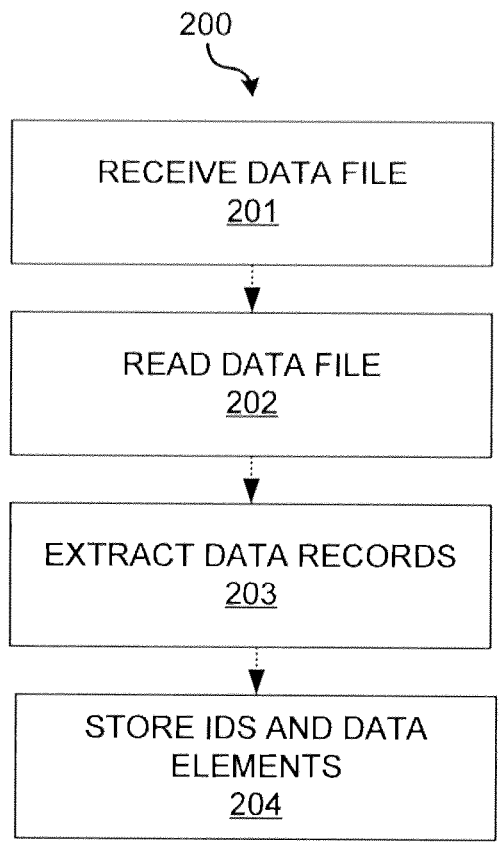
FIG. 2 is a flow chart illustrating an overview of an exemplary agnostic data storage method in accordance with an embodiment of the systems and methods described herein.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Agnostic data storage systems and methods are provided. The agnostic data storage system and method have data structures that are more extensive over time and are capable of saving different data having different data types or structures from various data sources. IDs and data elements of each data record are stored in a first data table and a second data table, respectively. Preferably, some or all of the second data table entries are linked to respective first data table entries. For each data record, any number of data elements that describe the data record can be stored in the second data table. The second data table stores the name, the value, and the data type of each data element. Data structures for the second data table are defined without first knowing the name and the data type for data elements of each data record.

Before describing the invention in detail, it is useful to describe an example environment with which the invention can be used. FIG. 1 is a diagram illustrating a simplified environment 100 in which an exemplary adaptive data storage system 102 operates in accordance with an embodiment of the invention. In this example environment, the data storage system 102 is connected to at least one data source from data sources 101 A through D and at least one user from users 103 A through D. The data storage system 102 stores data from the at least one data source from data sources 101 A through D and provides data to the at least one user from users 103 A through D based on their needs. A user may be a human, a module, a computer or computer program, or other entities. The data storage system 102 may be configured to receive data files from data sources 101 A through D. The data source can be any of a number of data sources, such as, for example, a school, a hospital, a bank, etc. The data file can be in different file types such as a .txt file, a .dat file, a .xml file, a .csv file, or a .xml file, etc. The data file typically contains data related to a subject of interest to a user. For example, a subject may be a location weather, a hedge fund position, or a stock price, etc. The data file 110 may include at least one data record 111, each data record 111 corresponds to a particular instance of a subject, or contents of the data file 110 can be extracted into data records 111. Each data record 111 may include at least one ID 112 that identifies the instance of the subject, and at least one data element 114 that describes the instance of the subject.

Take the hedge fund position for example, an instance of a hedge fund position can be uniquely identified by six pieces of information: the company, the accounting system, the particular account, the currency, the security, and its position (e.g., either long or short). Said differently, a hedge fund of a company holds a position based on the accounting system in a particular account in a particular currency for a certain security and its position is either long or short. Thus, an instance of a hedge fund position corresponds to a data record 111, which can be identified by an ID 112 including the CompanyID, DataSourceID, CustodianAccountID, CurrencyID, SecurityID, and Longshort collectively. Each of these IDs is a subsidiary ID 113.

For a particular instance of the subject, many data elements can describe it and these data elements are attributes of the subject. In the hedge fund position example, the quantity, the local price, the price book, the local cost, and the local market value are examples of attributes of a particular hedge fund position and can be used to describe the particular hedge fund position. In the described example, each data element 114 has a data element name 115, a data element value 116 and a data element data type 117. A data type is a classification identifying one of various types of data, such as, for example, floating point, integer or Boolean, which determines the possible value for that type.

The data storage system provides data to a user from the users 103 A through D based on the user's requests. The requested data may be data files, data records, IDs, data elements, or in other formats of data. In some embodiments, the data storage system 102 provides the requested data in a user-defined format.

From time-to-time, the present invention is described herein in terms of this example environment. Description in terms of this environment is provided to allow the various features and embodiments of the invention to be portrayed in the context of an exemplary application. After reading this description, it will become apparent to one of ordinary skill in the art how the invention can be implemented in different and alternative environments.

The present invention is directed toward a system and method for providing an agnostic data storage system. According to various embodiments of the invention, agnostic data storage systems and methods are provided for storing data records from various data sources. The agnostic data storage systems and methods have data structures that are more extensive over time and are capable of saving different source data of different data types or structures from different data sources. IDs and data elements of each data record are stored in a first data table and a second data table, respectively. Each second data table entry is linked to a first data table entry. For each data record, any number of data elements that describe the data record can be stored in the second data table. The second data table stores the name, the value, and the data type of each data element. Data structures for the second data table are defined without first knowing the name and the data type for data elements of each data record.

FIG. 2 illustrates an overview of an exemplary adaptive data storage method 200 in accordance with an embodiment of the systems and methods described herein. Referring now to FIG. 2, at step 201, the method receives a data file from a data source. The data source can be any source of data that may be of interest to the user using the data storage system such as, for example, a school, a hospital, a bank, or other entities. The data file is related to a subject of interest to a user. For example, a subject may be a location weather, a hedge fund position, a stock price, or other subjects. The data file may include, for example, at least one data record, and, in some embodiments, each data record corresponds to a particular instance of a subject.

At step 202, the method reads the data file. In one embodiment, the method creates and stores a server procedure, such as for example a SQL server procedure, and uses the stored server procedure to read the data file. At step 203, the method extracts data records from the data file. Each data record includes at least one ID and at least one data element. At step 204, the method stores the IDs and data elements of all data records. In one embodiment, the method stores the IDs and data elements into two data tables that are based on a key-value pair structure. IDs are stored in the first data table and data elements are stored in the second data table. Each first data table entry identifies a data record, and each second data table entry describes a data record. In one embodiment, each second data table entry is linked to a first data table entry, and each first data table entry may be linked to any number of second data table entries. The stored IDs and data elements can be retrieved in the future. In one embodiment, data records can be reformed and represented in a normalized-format from the retrieved IDs and data elements.

FIG. 3 illustrates data structures 300 for data tables 301 and 311 of an agnostic data storage system in accordance with an embodiment of the systems and methods described herein. In one embodiment, two data tables are used and data structures are defined respectively for each data table. The data table Instance 301 stores IDs. IDs for each instance of a subject are stored in a generic row of the data table Instance 301 as a data table entry. Each key defined in the data structure for the data table Instance 301 corresponds to a column of the data table Instance 301. An example data structure for this data table Instance 301 includes a key InstanceID 305. The key InstanceID 305 is unique to each row of the data table Instance 301.

Additionally, in one embodiment, an example data structure for the data table Instance 301 includes a key ID 307. The key ID 307 is an ID of a data record. In various embodiments, an additional key Subsidiary ID 308 is included in the example data structure for the data table Instance 301. In one embodiment, the example data structure for the data table Instance 301 includes a key NaturalKey. The example key NaturalKey is a logical key that has a logical relationship to all the IDs and subsidiary IDs and is unique to the instance of the subject. In some embodiments, various pieces of information that uniquely identify the instance of the subject are hashed into an example binary NaturalKey to aid in quick searching. In various embodiments, the data structure for the data table Instance 301 includes additional keys 309. The additional keys may be used for identification purposes or for other purposes. Examples of additional keys may include "Createdby," "CreatedOn," and "RowTimestamp." In one embodiment, the data structure includes a Nullable column so that the user has control over whether to nullify a data entry in the data store when the column is not applicable. The data structure for the data table Instance 301 includes a definition of data type for each key. It will become apparent to one of ordinary skill in the art after reading this description that other keys (column names) and various data types can be used to define the data structure for Instance 301.

With further reference to FIG. 3, the data table Instance-Data 311 stores data elements. Generally, a data element is an attribute of a subject, and a data element of a particular data record is an attribute of the particular instance of the subject. Attributes of each instance of a subject are stored in a generic row of the data table InstanceData 311. Each key defined in the data structure for the data table InstanceData 311 corresponds to a column of the data table InstanceData 311. An example data structure for this data table InstanceData 311 includes a key InstanceDataID 315 and a key InstanceID 316. The example key InstanceDataID 315 is unique to a row of the data table InstanceData 311, which is a data element that describes an instance of a subject. The example key InstanceDataID 315 is unique to that data element. In one embodiment, the InstanceID 305 and the InstanceDataID 315 link the data table Instance 301 with the data table InstanceData 311. All attributes of the particular instance of the subject can be stored in generic rows of the data table InstanceData 311 and these rows are linked to the corresponding row of the data table Instance 301. For each instance of the subject identified by and of which IDs are stored in a generic row of the data table Instance 301, any number of rows that are linked to this instance may be stored in the data table InstanceData 311. Accordingly, a user can store all data elements for any data record without deleting anything.

The data structure for the data table InstanceData 311 is defined such that the data table InstanceData 311 is agnostic to the name and the data type of a particular data element. In other words, for each data element, which is an attribute of a data record, the data structure for the data table InstanceData 311 can be defined without first knowing the name and the data type in order to store the data element. The data structure for the data table InstanceData 311 can be defined to include all relevant data types, and the data element is stored when the data type matches a defined data type. Illustrative examples of data types include character, variable character, decimal, bit, integer, short integer, long integer, floating point, double precision floating point, long double precision floating point, Boolean, list or array, two-dimensional array, alphanumeric strings, date, date-time, and all other data types. In one embodiment, an example data structure for the data table InstanceData 311 includes a key Name 317, a key ValueText 318, a key ValueDecimal 319, a key ValueDatetime 320, and a key ValueBit 321. In one embodiment, the key Name 317 is defined to be the data type variable character, the key ValueText 318 is defined to be the data type variable character, the key ValueDecimal 319 is defined to be the data type decimal, the key ValueDatetime 320 is defined to be the data type date-time, and the key ValueBit 321 is defined to be the data type bit. Other data types can be added as a key in the data structure for the data table InstanceData 311, then a corresponding column will be added to the data table InstanceData 311.

Still referring to FIG. 3, a data element is stored in the data table InstanceData 311 as a data table entry where the name of the data element is stored under the "Name" column and the value of the data element is stored under the column of which the data type matches the data type of the data element. For example, if a data element is a decimal number, then the value of the data element is stored under the "ValueDecimal" column. The entries under the other columns of which the data types do not match the data type of the data element will be nulled or flagged as not applicable. Data structure for the data table InstanceData 311 is not defined for storing a data element of a particular data type. Different data sources may name an attribute of a subject differently, but all these names for this particular attribute can be stored in the data table InstanceData 211. An attribute of a subject may have different data types, then all corresponding data elements having different data types can be stored in the data table InstanceData 311.

In various embodiments, the data structure for the data table Instance 311 includes additional keys 322. These additional keys may be used for identification purposes or for other purposes, such as to indicate the creator, to indicate the creation time, to show the time stamp. Illustrative examples of additional keys include "Createdby," "CreatedOn," "RowTimestamp," etc. In one embodiment, the data structure includes a Nullable column so that the user has control over whether to nullify a data entry in the data store when the column is not applicable. The data structure for the data table Instance 311 includes data type definition for each key. It is apparent to one of ordinary skill in the art that other column names and data types can be used to define the data structure for InstanceData 311.

FIG. 4 illustrates data tables 301 and 311 of an exemplary adaptive data storage system in accordance with an embodiment of the invention. The data table Instance 301 stores IDs of data records. A row of the data table Instance 301 identifies an instance of a subject, which corresponds to a data record. For example, for the data record identified by the InstanceID 311, its ID 3 is stored as a data table entry. In one embodiment, additional IDs or subsidiary IDs of a data record can be stored as a data table entry. Thus, a data table entry includes one or more data table cells. A user can determine what ID or IDs, or what subsidiary ID or subsidiary IDs to be stored in the data table Instance 301. In one embodiment, the data table Instance 301 includes a Generation column 301 to show the generation of the particular data record. Each time when there is a change to the data record identification, the generation of the particular data element will increase by one (1).

The data table InstanceData 311 stores data elements of data records. A row of the data table InstanceData 311 is an attribute of the instance of the subject. For example, for the data record identified by the ID 511, its data element is stored as a data table entry in data table InstanceData 311. The data element name "Date" is stored under the example column Name 317. The data element value "2012-07-05 12:01:00" is stored under the example column ValueDatetime 320. Because this date element is of the data type Datetime, "Null" is stored under the example columns ValueText 318, ValueDecimal 319, and ValueBit 321 to show that the data types of these columns are not applicable to this data element. The names, values, and data types of four data elements are stored as data table entries for the example data record 311. A user can determine what information of a data element to be stored in the data table InstanceData 311. Additional columns of various data types can be added to the data table InstanceData 311 without overwriting the existing columns, so the user has the benefit of keeping all the data elements stored. Because no column needs to be deleted or changed in the data table InstanceData 311, data elements stored previously in the data table using an earlier data structure can still be stored and displayed in the data table with the current data structure.

Still referring to FIG. 4, in one embodiment, the data table InstanceData 311 includes a Generation column 402 to show generation of the particular data element. Each time when there is a change, the generation of the particular data element will increase by one (1). All the earlier generations of the data elements are stored in the data table.

Figure 5:
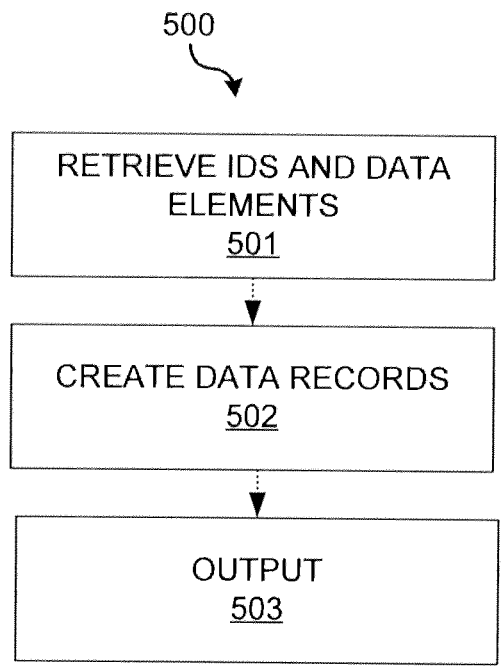
FIG. 5 is a flow chart illustrating an overview of an exemplary agnostic data storage method in accordance with an embodiment of the systems and methods described herein.

FIG. 5 illustrates an overview of an exemplary adaptive data storage method 500 in accordance with an embodiment of the invention. At step 501, the method retrieves the stored IDs and data elements. A user may define what fields of a data record should be retrieved, and the method retrieves the IDs and data elements accordingly. At step 502, the method creates data records by associating the IDs and the data elements. The created data records may be in a normalized format. At step 503, the method returns the retrieved IDs and data elements in a format defined by the user. Here, the user may be a human, a module, a computer program, or other entities. The format may be in a normalized data table, the method consolidates the retrieved IDs and data elements where the IDs and data elements are stored in different data tables. Or the method may output the IDs and data elements in separate user-defined data tables.

Figure 6:
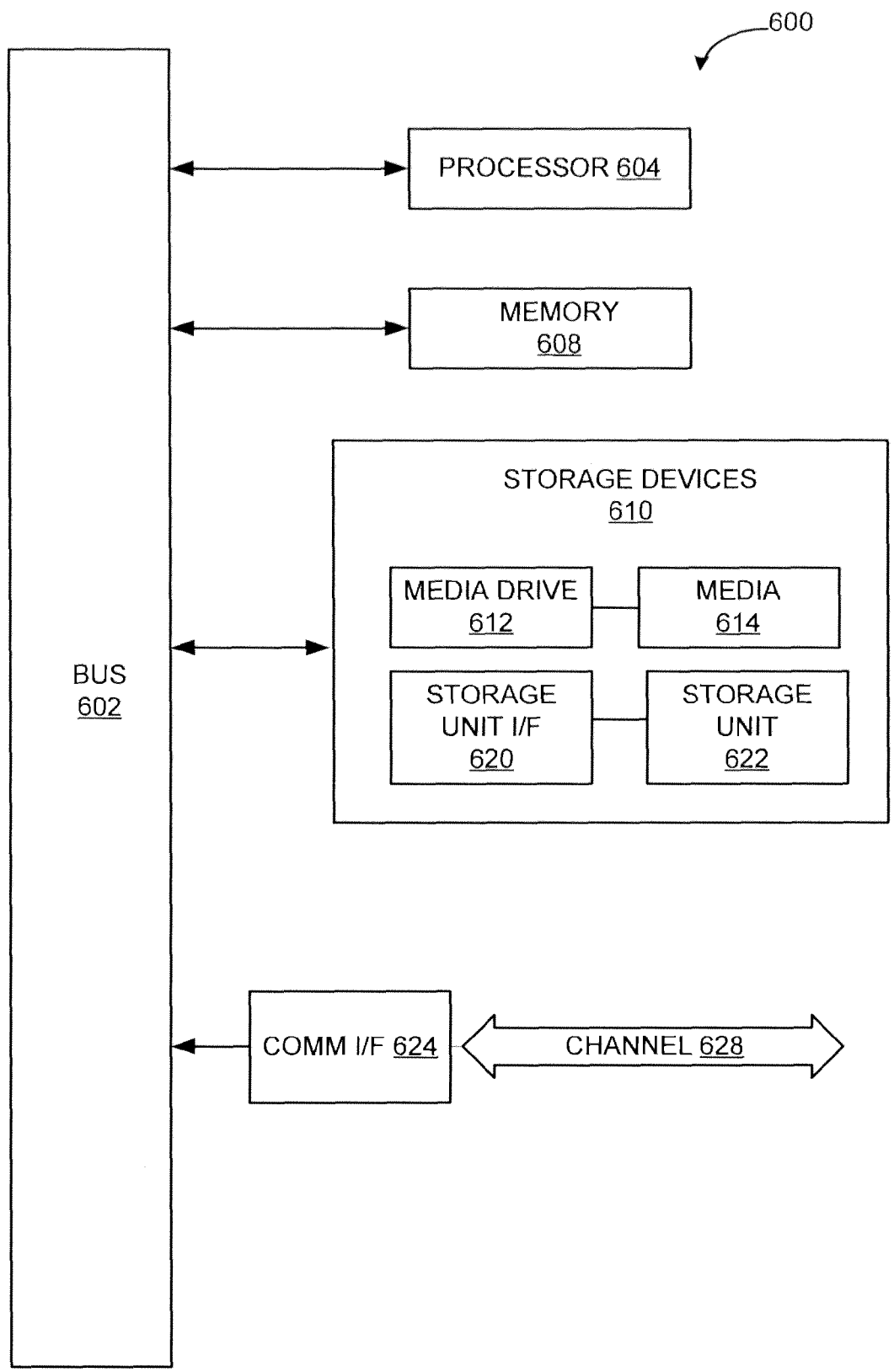
FIG. 6 is a diagram illustrating an example of a computing module that may be used in implementing various features of embodiments of the invention.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example-computing module 600. After reading this description, it will become apparent to a person skilled in the relevant art how to implement the invention using other computing modules or architectures.

Referring now to FIG. 6, computing module 600 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory, might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), or other removable or fixed media drive might be provided. Accordingly, storage media 614 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing module 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A data storage system comprising:
a processor configured to receive a set of data records from a data source for storage in a data store, a data record of the set of data records corresponding to a particular instance of a subject and comprising:
an identification (ID) identifying the instance of the subject; and
a data element describing the instance of the subject; and
the data store comprising a first data table and a second data table, the first data table storing the ID as a first data table entry and the second data table storing the data element as a second data table entry, the second data table entry comprising a link to the first data table entry, a data element name of the data element, a data element value of the data element, and a data element data type of the data element;
wherein the second data table comprises a plurality of columns for a plurality of different data types, and wherein the second data table entry corresponds to one of the plurality of columns according to the data element data type of the data element.

2. The data storage system of claim 1, wherein the data record further comprises a plurality of data elements, and wherein the second data table stores each of the plurality of data elements as a separate second data table entry, each separate second data table entry comprising a separate link to the first data table entry, a separate data element value of the corresponding data element of the plurality of data elements, and a separate data element type of the corresponding data element of the plurality of data elements.

3. The data storage system of claim 1, wherein each of the plurality of columns has a data type selected from the group consisting of a text, a decimal, a date time, and a value bit.

4. The data storage system of claim 1, wherein the ID comprises a plurality of subsidiary IDs, the first data table storing each of the plurality of subsidiary IDs as a separate first data table entry.

5. The data storage system of claim 4, wherein the first data table entry further comprises a natural ID key, the natural ID key having a logical relationship to the plurality of subsidiary IDs.

6. The data storage system of claim 1, wherein the processor is further configured to receive a data file from the data source and extract the data file into the set of data records.

7. The data storage system of claim 1, wherein the processor is further configured to receive a first plurality of sets of data records from a second plurality of data sources.

8. The data storage system of claim 1, wherein the processor is further configured to retrieve the first data table and the second data table.

9. The data storage system of claim 1, wherein the first data table entry comprises a first generation key and the second data table entry comprises a second generation key, the first generation key and the second generation key being associated with the data record.

10. The data storage system of claim 1, wherein the ID is not stored in the second data table.

11. The data storage system of claim 10, wherein the data element is not stored in the first data table.

12. A method of storing a set of data records comprising:
receiving the set of data records from a data source for storage in a data store comprising a first data table and a second data table, a data record of the set of data records corresponding to a particular instance of a subject and comprising:
an identification (ID) identifying the instance of the subject; and
a data element describing the instance of the subject, and
storing the ID as a first data table entry in the first data table; and
storing the data element as a second data table entry in the second data table, the second data table entry comprising a link to the first data table entry, a data element name of the data element, a data element value of the data element, and a data element data type of the data element;
wherein the second data table comprises a plurality of columns for a plurality of different data types, and wherein the second data table entry corresponds to one of the plurality of columns according to the data element data type of the data element.

13. The method of claim 12, wherein the data record further comprises a plurality of data elements, and wherein the second data table stores each of the plurality of data elements as a separate second data table entry, each separate second data table entry comprising a separate link to the first data table entry, a separate data element value of the corresponding data element of the plurality of data elements, and a separate data element type of the corresponding data element of the plurality of data elements.

14. The method of claim 12, wherein each of the plurality of columns has a data type selected from the group consisting of a text, a decimal, a date time, and a value bit.

15. The method of claim 12, wherein the ID comprises a plurality of subsidiary IDs, the first data table storing each of the plurality of subsidiary IDs as a separate first data table entry.

16. The method of claim 15, wherein the first data table entry further comprises a natural ID key, the natural ID key having a logical relationship to the plurality of subsidiary IDs.

17. The method of claim 12, further comprising receiving a data file from the data source and extract the data file into the set of data records.

18. The method of claim 12, further comprising receiving a first plurality of sets of data records from a second plurality of data sources.

19. The method of claim 12, further comprising retrieving the first data table and the second data table.

20. The method of claim 12, wherein the first data table entry comprises a first generation key and the second data table entry comprises a second generation key, the first generation key and the second generation key being associated with the data record.

21. The method of claim 12, wherein the ID is not stored in the second data table.

22. The method of claim 21, wherein the data element is not stored in the first data table.

23. A system, comprising:
a data store comprising a first data table and a second data table;
one or more processors;
one or more non-transitory computer-readable mediums operatively coupled to at least one of the one or more processors and having instructions stored thereon that, when executed by at least one of the one or more processors, cause at least one of the one or more processors to:
receive a set of data records from a data source for storage in the data store, a data record of the set of data records corresponding to a particular instance of a subject and comprising:
an identification (ID) identifying the instance of the subject; and
a data element describing the instance of the subject;
store the ID as a first data table entry in the first data table; and
store the data element as a second data table entry in the second data table, the second data table entry comprising a link to the first data table entry, a data element name of the data element, a data element value of the data element, and a data element data type of the data element;
wherein the second data table comprises a plurality of columns for a plurality of different data types, and wherein the second data table entry corresponds to one of the plurality of columns according to the data element data type of the data element.

* * * * *